US011346283B2

(12) United States Patent
Dickert et al.

(10) Patent No.: US 11,346,283 B2
(45) Date of Patent: May 31, 2022

(54) ENGINE ASSEMBLY WITH COVER MEMBER

(71) Applicant: Rolls-Royce Deutschland Ltd & Co KG, Blankenfelde-Mahlow (DE)

(72) Inventors: Uwe Dickert, Berlin (DE); Carsten Fuchs, Zechin (DE); Robert Thies, Schwielowsee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 198 days.

(21) Appl. No.: 16/787,614

(22) Filed: Feb. 11, 2020

(65) Prior Publication Data

US 2020/0263608 A1    Aug. 20, 2020

(30) Foreign Application Priority Data

Feb. 15, 2019  (DE) ..................... 10 2019 202 072.0

(51) Int. Cl.
*F02C 7/25*    (2006.01)
(52) U.S. Cl.
CPC ..................... *F02C 7/25* (2013.01)
(58) Field of Classification Search
CPC ..................... F02C 7/20; F02C 7/25
See application file for complete search history.

(56) References Cited

U.S. PATENT DOCUMENTS

| 2,604,339 | A |   | 7/1952  | Kaysing et al. |
| 2,613,087 | A | * | 10/1952 | Alford ..................... F02K 1/80 285/261 |
| 4,907,743 | A |   | 3/1990  | Bouiller et al. |
| 7,677,026 | B2 | * | 3/2010  | Conete ..................... F02K 1/48 60/262 |

(Continued)

FOREIGN PATENT DOCUMENTS

DE    102011106964 A1    1/2013

OTHER PUBLICATIONS

German Search Report dated Oct. 28, 2019 for counterpart German Patent Application No. 10 2019 202 072.0.

*Primary Examiner* — Lorne E Meade
(74) *Attorney, Agent, or Firm* — Shuttleworth & Ingersoll, PLC; Timothy Klima

(57) ABSTRACT

The proposed solution concerns in particular an engine assembly with
  a casing part extending along a central axis,
  at least one cover part which at least partially covers an outside of the casing part, and for this, in relation to the central axis, extends along a circumferential direction which points along a circular path around the central axis, and
  at least one connecting element via which the at least one cover part is fixed relative to the casing part and which compensates for different thermal expansions of the casing part and the at least one cover part.
It is proposed amongst others that the connecting element is part of a connecting assembly which comprises, in addition (Continued)

to the at least one connecting element, at least one separate supporting element which has thicker walls than the at least one connecting element and supports the first and second flange portions of the at least one connecting element against each other, and extends between the first and second flange portions with a flexibly formed expansion portion.

19 Claims, 9 Drawing Sheets

(56) References Cited

U.S. PATENT DOCUMENTS

| | | | |
|---|---|---|---|
| 8,424,312 B2 * | 4/2013 | Conete | F02K 1/52 60/796 |
| 8,800,300 B2 * | 8/2014 | Hashimoto | F01D 25/28 60/799 |
| 8,919,136 B2 * | 12/2014 | Conete | F02K 1/04 60/799 |
| 9,003,810 B2 * | 4/2015 | Porte | B64D 29/08 60/796 |
| 10,830,103 B2 * | 11/2020 | Mohammed | F01D 11/005 |
| 2008/0115484 A1 | 5/2008 | Conete et al. | |
| 2010/0205930 A1 | 8/2010 | Conete et al. | |
| 2011/0203255 A1 | 8/2011 | Conete | |
| 2012/0097261 A1 | 4/2012 | Porte et al. | |
| 2018/0156369 A1 | 6/2018 | Tajiri et al. | |
| 2019/0010827 A1 | 1/2019 | Mohammed et al. | |

* cited by examiner

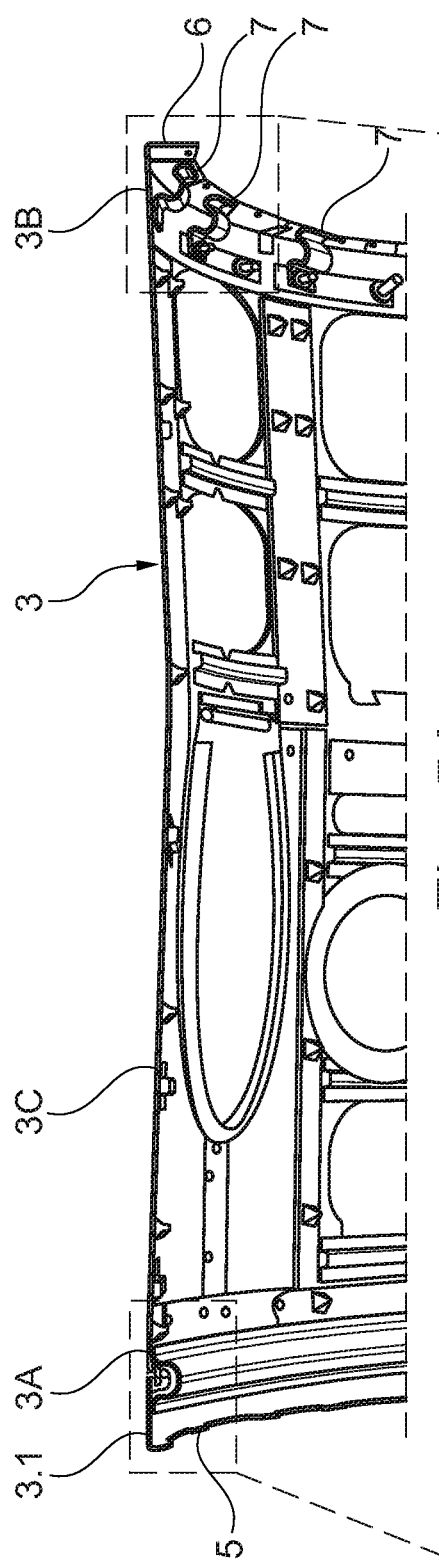
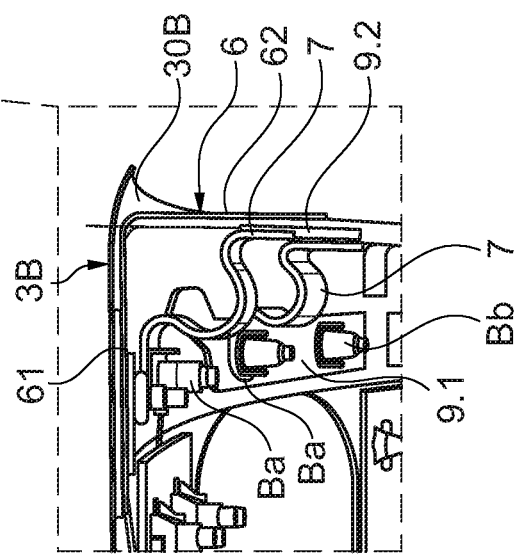
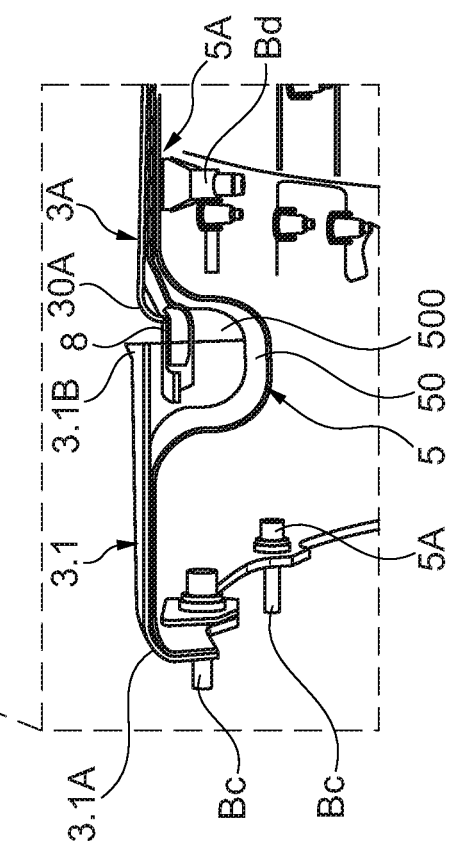

ENGINE ASSEMBLY WITH COVER MEMBER

This application claims priority to German Patent Application DE102019202072.0 filed Feb. 15, 2019, the entirety of which is incorporated by reference herein.

The proposed solution concerns an engine assembly with a casing part extending along a central axis, and at least one cover part which at least partially covers an outside of the casing part.

Inside an engine, in particular inside a gas turbine engine such as for example an aircraft engine, various casing parts are used which must be at least partially covered by a corresponding cover. For example, a casing part of the core engine on a gas turbine engine is typically covered by several radially outer cover parts which then form an inner wall of a bypass duct of the gas turbine engine. A casing part of the core engine is usually described as a "core casing". A corresponding cover part is called a "core fairing".

In principle, the problem in this context is that, depending on the arrangement of the corresponding components inside the engine, the casing parts and cover parts may expand to different extents under the effect of heat. The individual components and their fixings must accordingly be designed such that different thermal expansions can be compensated.

US 2008/0115484 A1 for example discloses an engine assembly for an exhaust-side mixer with flower-shaped outer contour, in which a casing part of the mixer is connected to a cover part by several connecting elements that allow displacement of the casing part and cover part relative to each other when the casing part and cover part expand to different extents during operation of the engine. A flexibly formed expansion portion of these connecting elements here allows the thermally induced displacement. In the connecting elements of US 2008/0115484, this expansion portion is configured for example with U-shaped cross-section, as shown therein in FIG. 6B, and points in the axial direction relative to a central axis of the casing part. The engine assembly known from US 2008/0115484 A1 and the connecting elements provided therein are scarcely suitable in particular for compensating for different thermal expansions in the axial direction. In particular to compensate for different thermal expansions on a cover part and a casing part upstream of a turbine of a core engine, use of a connecting element known from US 2008/0115484 A1 is conceivable but not advantageous, since it is here above all that different thermal expansions occur in the axial direction and hence an axial length compensation is a priority.

In this context, the proposed solution is based on the object of providing an engine assembly which allows improved compensation for different thermal expansions between a casing part and a cover part at least partly covering this, and which allows compensation—even with comparatively long, longitudinally extended cover parts—without being so flexible that undesirable vibrations occur via the connecting element during operation of the engine.

This object is achieved both with an engine assembly as disclosed herein.

A first aspect of the proposed solution here provides an engine assembly which, as well as a casing part extending along a central axis and at least one cover part that at least partially covers an outside of the casing part, also comprises at least one connecting element via which the at least one cover part is fixed relative to the casing part and which compensates for different thermal expansions of the casing part and the at least one cover part. The at least one connecting element here comprises two flange portions for connecting the cover part to the casing part or to another engine component connected to the casing part, of which a first flange portion is connected to the cover part and a second flange portion is connected to the casing part or to the other engine component. Furthermore, the at least one connecting element is part of a connecting assembly which comprises, in addition to the at least one connecting element, at least one separate supporting element which has thicker walls than the at least one connecting element. This supporting element supports the first and second flange portions of the connecting element against each other, and extends between the first and second flange portions with a flexibly formed expansion portion.

The solution proposed according to the first aspect is thus based on the fundamental concept of providing an at least two-piece connecting assembly, in which by use of a connecting element and at least one supporting element, different functions to be provided by the connecting assembly can be performed by different components of the connecting assembly. Thus the connecting element, which has thinner walls in comparison with the supporting element, may for example be formed relatively lightweight, but by its design be fire-resistant or at least fire-inhibiting, and provide the connection of the connecting assembly a) to the cover part and b) to the casing part or an engine component connected to the casing part. The thicker-walled supporting element also provided furthermore prevents undesirable vibrations and ensures that, despite its flexibility, the connecting assembly has the necessary stability to compensate for different thermal expansions.

The cover part is fixed to the casing part e.g. at the end relative to the central axis, i.e. at the front or rear, i.e. at a front or rear end of the cover part relative to the central axis, via the at least one connecting element. This in particular includes that at least one connecting element is fixed to the casing part itself and to the cover part. It does not however include that the connecting element is fixed or moulded onto the cover part and then additionally (at front or rear) fixed to an engine component adjoined by the casing part that is at least partially covered by the cover part, in the direction of the central axis or which adjoins the casing part that is at least partially covered by the cover part, in the direction of the central axis. Thus the cover part may be fixed via the at least one connecting element, for example at the rear, to a flange of an engine component downstream in the flow direction in order to at least partially cover a casing part of a core engine of the engine via the cover part. A corresponding cover part may furthermore, alternatively or additionally, for example be fixed in principle via a (first) connecting element at a front end to a rear flange of an intermediate casing, and via a (second) connecting element at a rear end to a flange of a casing of a turbine stage, in particular a high-pressure turbine or a low-pressure turbine stage.

Compensation for different thermal expansions of the casing part and the at least one cover part here in principle means that, via the at least one connecting element, thermally induced changes of different extent, occurring during operation of the engine, in the shape of the casing part firstly and the cover part secondly are compensated, in that by a deliberately permitted deformation of the at least one connecting element, a thermally induced relative movement between the cover part and casing part is permitted without the at least one connecting element failing under this deformation. The at least one connecting element is configured and provided accordingly to compensate for different thermal expansions of the casing part and the at least one cover part during operation of the engine.

The proposed compensation for different thermal expansions relates, in one exemplary embodiment, to compensation in the axial direction relative to the central axis. This in particular includes that, via the at least one connecting element, in combination with the supporting element of the connecting assembly according to the first aspect, thermally induced deformations of different extent, in particular elongations along the central axis, of the casing part firstly and the cover part secondly, during operation of the engine, are compensated.

The additionally provided supporting element may here, via its flexible expansion portion, provide corresponding deformation of the connecting element to compensate for the different thermal expansions, but via the support of the flange portions of the connecting element ensures that the connecting element is not too greatly stressed mechanically.

The expansion portion of the supporting element may here for example comprise a corrugated region. The bending strength of the supporting element is deliberately reduced by a corrugated region of the expansion portion, in order to allow a corresponding deformation of the connecting element under a thermally induced displacement of the first and second flange portions of the connecting element relative to each other. Because of the thicker-walled design of the supporting element, the supporting element has a greater stiffness and supports the connecting element so as to prevent undesirable vibrations occurring on the cover part.

The selected region of the extension portion is for example formed S-shaped in cross-section. The cross-section here refers to a cross-sectional view parallel to the central axis.

In one embodiment variant, in cross-section, the expansion portion forms a convex curve and two concavely curved connecting regions, between which the convex curve lies. Such a design of an expansion portion has proved advantageous for specific applications in order to achieve a favourable compromise between sufficient stiffness to inhibit vibrations and simultaneously adequate flexibility. In this context, it may for example be provided that the (greater) convex curve has a radius of curvature which is at least five times greater than a mean wall thickness of the supporting element. For a radius of curvature $r7a$ of the convex curve, in relation to a mean wall thickness $t7$ of the supporting element:

$$r7a/t7 \geq 5.$$

Alternatively or additionally, the radius of curvature of a concave curve may exceed a mean wall thickness of the supporting element by more than three times, or correspond to at least three times the mean wall thickness of the supporting element. For a radius of curvature $r7b$ of a concave curve, in relation to a mean wall thickness $t7$ of the supporting element:

$$r7b/t7 \geq 3.$$

With a view to providing adequate flexibility above all in the middle region of the expansion portion with the convex curve, in one embodiment variant it is provided that a radius of curvature of the convex curve is in each case greater than a radius of curvature of one of the concave curves ($r7a > r7b$).

The expansion portion may furthermore form a convex curve which defines a depression of U-shaped cross-section on the expansion portion. In a cross-sectional view, in combination with at least one concave curve, such a U-shaped depression may also have an S-shape in cross-section. With a view to compromise between adequate flexibility and necessary stiffness, for certain applications it has for example been found that, for a ratio of a maximal depth/height of this depression with U-shaped cross-section. This should lie in the range of nine times a mean wall thickness of the supporting element or even more. For a maximal height $h7$ of this depression with U-shaped cross-section, in relation to a mean wall thickness $t7$ of the supporting element:

$$h7/t7 \geq 9.$$

In one embodiment variant, the connecting element extends with a width in the circumferential direction which is many times greater than a width with which the supporting element extends in the circumferential direction. For example, for a width $b6$ of the connecting element in relation to a width $b7$ of the supporting element:

$$b6/b7 \geq 3, \text{ in particular } b6/b7 \geq 10.$$

The thicker-walled supporting element may thus be configured narrower than the connecting element with respect to the circumferential direction.

In one embodiment, with respect to a mounting state of the engine assembly in which an engine comprising the engine assembly is not in operation, the connecting element, which is thinner-walled than the supporting element of the connecting assembly, is configured with L-shaped or V-shaped cross-section. In other words, the connecting element here is formed L-shaped or V-shaped in a cross-sectional view parallel to the central axis. In particular, a connecting element with an L-shaped or V-shaped cross-section may be formed longitudinally extended in a circumferential direction about the central axis. Because of the proposed functional split and the associated additional provision of at least one supporting element, such a connecting element may be designed comparatively easily as a fire-inhibiting or fire-resistant bulkhead without the need to provide a more complex contouring for sufficient stiffness. The corresponding stiffness is rather provided by an additional supporting element or several additional supporting elements.

A supporting element may here in principle have a smaller (mean) width, measured parallel in the circumferential direction, than the connecting element. Whereas the connecting element may for example be formed longitudinally extended in a circumferential direction around the central axis and hence comparatively wide, the supporting element in comparison with the connecting element then has a substantially smaller width, e.g. only a fraction of the width.

With respect to the differing wall thicknesses of the connecting element and the supporting element, in one embodiment variant for example it has proved advantageous if the connecting element has a mean wall thickness which is many times smaller than a mean wall thickness of the supporting element. For example, it may be provided that for a mean wall thickness $t7$ of the supporting element in relation to a mean wall thickness $t6$ of the connecting element:

$$t7/t6 \geq 3.$$

In principle, the connecting element and the supporting element may be configured as sheet metal parts. The wall thickness mentioned thus then relates to a corresponding sheet thickness.

For at least local reinforcement of the thinner-walled connecting element, one embodiment variant provides at least one reinforcing element on at least one of the first and second flange portions. Via such a reinforcing element, a wall thickness of the connecting element is locally increased in a region of the first or second flange portion a) on which the supporting element lies (and in some cases is fixed to the cover part with at least one fixing element), and/or b) at which at least one fixing element is provided for fixing the cover part to the casing part or to the other engine component connected to the casing part. The reinforcing element thus leads to a local stiffening of the connecting element in a region in which the respective flange portion is connected to at least one further component, and for example a fixing element passes through a fixing hole on the connecting element.

In a refinement based thereon, the reinforcing element substantially increases a wall thickness relative to a mean wall thickness of the connecting element. For example, for a mean wall thickness t9 of the connecting element in relation to a mean wall thickness t6 of the connecting element:

$$(t6+t9)/t6 \geq 3.$$

The reinforcing element may for example be welded to the connecting element. In particular, the reinforcing element may be configured as a sheet metal part. In one embodiment variant for example, it is provided that the reinforcing element is welded to the connecting element at a region of the flange portion at which the connecting element is bolted to the cover part or casing part.

In one embodiment variant, the connecting element is configured as a component serving for fire protection. The thinner-walled connecting region may thus be designed comparatively simply, in order to take account of the different thermal expansions of the cover part and casing part. A supporting element, which provides greater stiffness against undesirable vibrations and is therefore designed with thicker walls, but has no or almost no fire-inhibiting effect, may in comparison be designed in more complex fashion but be made of a material which is easier to process. For example, in a state correctly installed in an engine, the connecting element prevents the penetration of air in the direction of the casing part, for example from a bypass duct, and at the same time prevents the propagation of fire beyond the casing part in particular because the connecting element is made of a fire-resistant or at least fire-inhibiting material. Thus for example, the connecting element on a cover part used to cover a part of the core engine may prevent the propagation of fire beyond an engine region comprising the casing part (for example assigned to the core engine), for example into the bypass duct.

A further aspect of the proposed solution, which can simply be combined with the above-mentioned aspect, provides in an engine assembly at least one connecting element to compensate for different thermal expansions between a casing part and at least one cover part, wherein the connecting element has an expansion portion which forms a channel-like depression extending in the circumferential direction around the central axis of the casing part and U-shaped in cross-section, pointing radially inward or outward relative to the central axis.

A corresponding depression on a connecting element for the cover part allows effective axial compensation for different thermal expansions and is particularly suitable for elongate cover parts extending along the central axis, which in operation of an engine expand under the effect of heat to a lesser extent than a casing part assigned to the core engine.

In one embodiment variant, the two above-mentioned aspects are combined so that for example a cover part a) at a first end has a (first) connecting element with a channel-like depression extending in the circumferential direction and U-shaped in cross-section, pointing radially inward or outward, and b) at a second, other end relative to the central axis, has a connecting assembly with a (second) connecting element having two flange portions and a thicker-walled supporting element having a flexible expansion portion between the flange portions. For example, it may be provided that a cover part has a first connecting element with a U-shaped depression at a front end, at the front relative to the central axis in the flow direction of a fluid in an engine, and at a rear end, at the back, a connecting assembly with a second connecting element and a supporting element.

In principle, several cover parts may be provided along a circumferential direction about the central axis of the casing part, for at least partially covering an outside of the casing part. Such cover parts may be at least slightly spaced apart physically via a radial gap so that in the circumferential direction, no corresponding compensation for different thermal expansions is required. Furthermore, a cover part may be fixed at one end in principle via several (first or second) connecting elements. A connecting assembly may furthermore comprise a single (second) connecting element and several (at least two) supporting elements which are spaced apart from each other in the circumferential direction, in particular identical supporting elements, which each have a flexible expansion portion extending between the first and second flange portions of the one connecting element.

According to one aspect, a gas turbine engine is provided which comprises an engine assembly according to any embodiment described herein. The gas turbine engine may be, in particular, a gas turbine engine for an aircraft. The gas turbine engine comprises, for example, a core engine, which comprises a turbine, a compressor and a core shaft (rotor shaft) connecting the turbine to the compressor; a fan which is positioned upstream of the core engine, wherein the fan comprises a plurality of fan blades; and optionally a gear mechanism, which can be driven by the core shaft, wherein the fan can be driven at a lower speed than the core shaft by means of the gear mechanism.

In the gas turbine engine, the turbine may be a first turbine, the compressor may be a first compressor and the core shaft may be a first core shaft. The core engine may further comprise a second turbine, a second compressor, and a second core shaft connecting the second turbine to the second compressor. The second turbine, the second compressor, and the second core shaft can be arranged so as to be able to rotate at a higher rotational speed than the first core shaft.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear mechanism. Accordingly, the gas turbine engine may comprise a gear mechanism which is driven via the core shaft and the output of which drives the fan in such a way that it has a lower rotational speed than the core shaft. The input to the gear mechanism may be provided directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft connecting the second turbine to the second compressor. The second turbine, second compressor, and second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The gear mechanism may be designed to be driven by the core shaft that is configured to rotate (for example during use) at the lowest rotational speed (for example the first core shaft in the example above). For example, the gear mechanism may be designed to be driven only by the core shaft that is configured to rotate (for example during use) at the lowest rotational speed (for example only by the first core shaft and not the second core shaft, in the example above). Alternatively, the gear mechanism may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of further example, the flow at the exit of the compressor may be supplied to the inlet of the second turbine, when a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of attack may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location over which gas flows, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely as a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of a further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan casing.

The overall pressure ratio of a gas turbine engine as described and/or claimed herein may be defined as the ratio of the ram pressure upstream of the fan to the ram pressure at the exit of the highest pressure compressor (before entry into the combustor). By way of a non-limiting example, the overall pressure ratio of a gas turbine engine as described and/or claimed herein at constant speed can be greater than (or in the magnitude of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or on the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or on the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or on the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or aerofoil portion of a fan blade described and/or claimed herein may be produced from any suitable material or combination of materials. For example at least a part of the fan blade and/or aerofoil may be produced at least in part from a composite, for example a metal matrix composite and/or an organic matrix composite, such as carbon fiber. As a further example, at least a part of the fan blade and/or aerofoil may be produced at least in part from a metal, such as e.g. a titanium-based metal or an aluminum-based material (such as e.g. an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber or aluminum-based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely as an example, such a fixture may be in the form of a dovetail that may slot into and/or be brought into engagement with a corresponding slot in the hub/disk in order to fix the fan blade to the hub/disk. As a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least part of the fan blades may be attached to the hub/disk by welding, such as e.g. linear friction welding.

The gas turbine engines described and/or claimed herein may or may not be provided with a variable area nozzle (VAN). Such a variable area nozzle may allow the exit area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any speed within these ranges may be the cruise condition. In the case of some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of magnitude of 11000 m. The cruise conditions may correspond to standard atmospheric conditions at any given altitude in these ranges.

Purely as an example, the cruise conditions may correspond to the following: a forward Mach number of 0.8, a pressure of 23000 Pa and a temperature of −55° C.

As used anywhere herein, "cruising speed" or "cruise conditions" may mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described above in relation to one of the above aspects can be applied to any other aspect, unless these are mutually exclusive. Furthermore, any feature or any parameter described here may be applied to any aspect and/or combined with any other feature or parameter described here, unless these are mutually exclusive.

The appended figures illustrate exemplary possible design variants of the proposed solution.

In the figures:

FIG. 1A shows diagrammatically and in extract, in a cross-sectional view, an embodiment variant of a proposed engine assembly in which a casing part of a core engine is covered on the outside by an elongate cover part that is fixed to the casing part at the front and rear ends via different connecting elements in order to compensate for different thermal expansions of the cover part and casing part;

FIG. 5A shows a cover part from FIG. 5 in extract, in a cross-sectional view along section line A-A from FIG. 5;

FIG. 6 shows an enlarged extract of the front end of the cover part from FIG. 5A;

FIG. 7 shows an enlarged extract of the rear end of the cover part from FIG. 5A;

Figure 11:
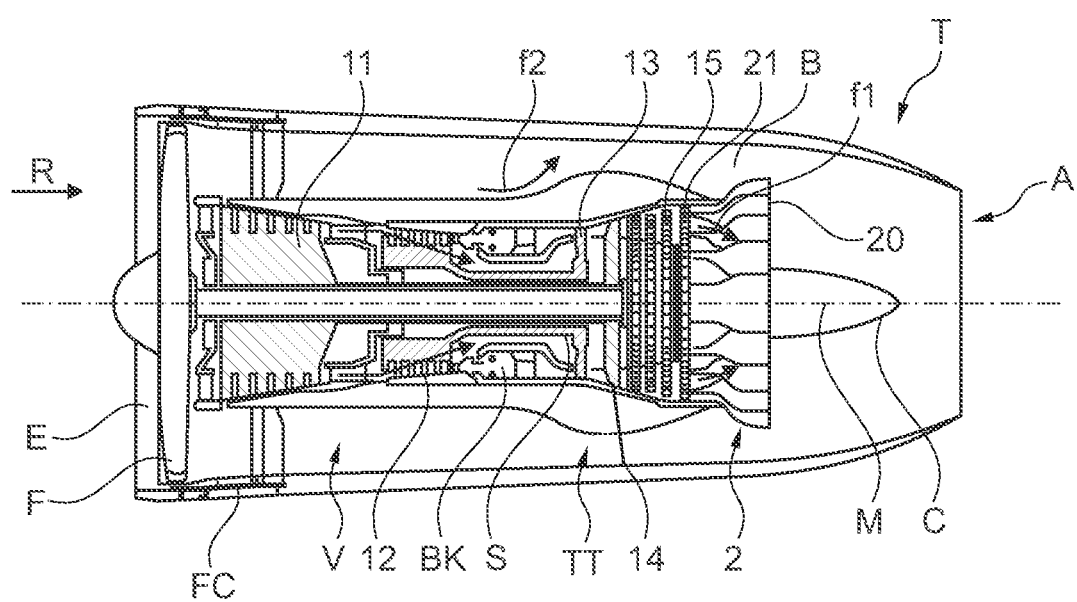
FIG. 11 shows, in a cross-sectional view, a gas turbine engine in which the proposed engine assembly is used.

FIG. 11 illustrates, schematically and in a cross-sectional view, a (turbofan) engine T in which the individual engine components are arranged successively along an axis of rotation or central axis M. At an inlet or intake E of the engine T, air is drawn in along an inlet direction R by means of a fan F. This fan F, which is arranged in a fan casing FC, is driven by means of a core or rotor shaft S which is set in rotation by a turbine TT of the engine T. The turbine TT here adjoins a compressor V, which has, for example, a low-pressure compressor 11 and a high-pressure compressor 12, and optionally also a medium-pressure compressor. The fan F supplies air to the compressor V on the one hand and to a secondary flow duct or bypass duct B on the other, in order to generate thrust. The bypass duct B runs here around a core engine, which comprises the compressor V and the turbine TT and comprises a primary flow duct for the air supplied to the core engine by the fan F.

The air fed into the primary flow duct via the compressor V enters a combustor section BK of the core engine, in which the driving energy for driving the turbine TT is generated. For this purpose, the turbine TT has a high-pressure turbine 13, a medium-pressure turbine 14 and a low-pressure turbine 15. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. In this arrangement, the outlet A generally has a thrust nozzle with a centrally arranged outlet cone C.

In principle, the fan F may also be coupled via a connecting shaft and an epicyclic planetary gear mechanism to the low-pressure turbine 15, and be driven by the latter. It is furthermore also possible to provide other, differently designed gas turbine engines in which the proposed solution can be used. For example, such engines may have an alternative number of compressors and/or turbines and/or an alternative number of connecting shafts. As an example, the engine may have a split-flow nozzle, meaning that the flow through the bypass duct B has its own nozzle, which is separate from and situated radially outside the core engine nozzle. However, this is not limiting, and any aspect of the present disclosure may also apply to engines in which the flow through the bypass duct B and the flow through the core are mixed or combined before (or upstream of) a single nozzle, which may be referred to as a mixed-flow nozzle. One or both nozzles (whether mixed or split flow) can have a fixed or variable area. While the example described relates to a turbofan engine, the proposed solution may be applied for example to any type of gas turbine engine, such as an open-rotor engine (in which the fan stage is not surrounded by an engine nacelle) or a turboprop engine.

For noise reduction in particular, a mixer 20 is provided as part of a mixer assembly 2 in the region of the outlet A. Via this mixer assembly 2 and the mixer 20, a first fluid stream f1 from the primary flow duct leaving the core engine behind the low-pressure turbine 15, and a second fluid stream f2 from the bypass duct B, are mixed. For this, via a flower-shaped or meandering contour of the mixer 20, alternately parts of the first (primary) fluid stream f1 from the core engine are deflected outward and parts of the second (secondary) fluid stream f2 from the bypass duct B are deflected inward. In this way, in segments hot and cold flow zones are created and a mixing of the two fluid streams f1 and f2 is achieved. The turbulence occurring on mixing reduces low-frequency noise and amplifies high-frequency noise, in order to lower the perceptible noise level overall.

The mixer assembly 2 is attached to engine components of the core engine in the region of an interface 21. In practice, this is associated with not inconsiderable difficulties. For example, for effective deflection of the fluid streams f1 and f2 from the primary flow duct and the bypass duct B, the mixer assembly 2 must be attached both to a first engine component assigned to the bypass duct B and to a second engine component assigned to the primary flow duct. For example, a first engine component is formed by a cladding component 5 of the core engine in the region of the low-pressure turbine 15, which forms a radially inner wall of the bypass duct B or lies adjacent thereto. A second engine component is for example a carrier component 6 of the low-pressure turbine 15 on which guide vanes are held at the outlet from the low-pressure turbine 15, or a secondary guide wheel is defined.

In operation of the turbofan engine T however, the two engine components assigned firstly to the primary flow duct and secondly to the bypass duct B, and at which the mixer assembly 2 is to be attached, are subjected to different operating temperatures. Thus it is not uncommon for the second engine component, past which the first hot fluid stream f1 of the primary flow duct is conducted, is heated more greatly, by at least more than 400 to 500° C., than the other first engine component past which the second fluid stream f2 of the bypass duct B is conducted. Thus in the region of the interface 21 of the mixer assembly 2, thermal expansions of different intensity and comparatively high temperature gradients occur which impose substantial loads on the different component connections.

The proposed solution may remedy this via at least a corresponding design of the connecting element, in order to achieve effective axial compensation for different thermal expansions. Alternatively or additionally, the proposed solution may also be used in the region of the core engine upstream of the turbine stage such as the low-pressure turbine 15, the medium pressure turbine 14 or the high-pressure turbine 13. In the exemplary embodiment presented in more detail below in FIGS. 1A to 7, as an example the proposed solution is used in conjunction with a casing part 4 of the core engine and a cover part 3 attached radially thereto on the outside in the form of a so-called core fairing.

Figure 1A:
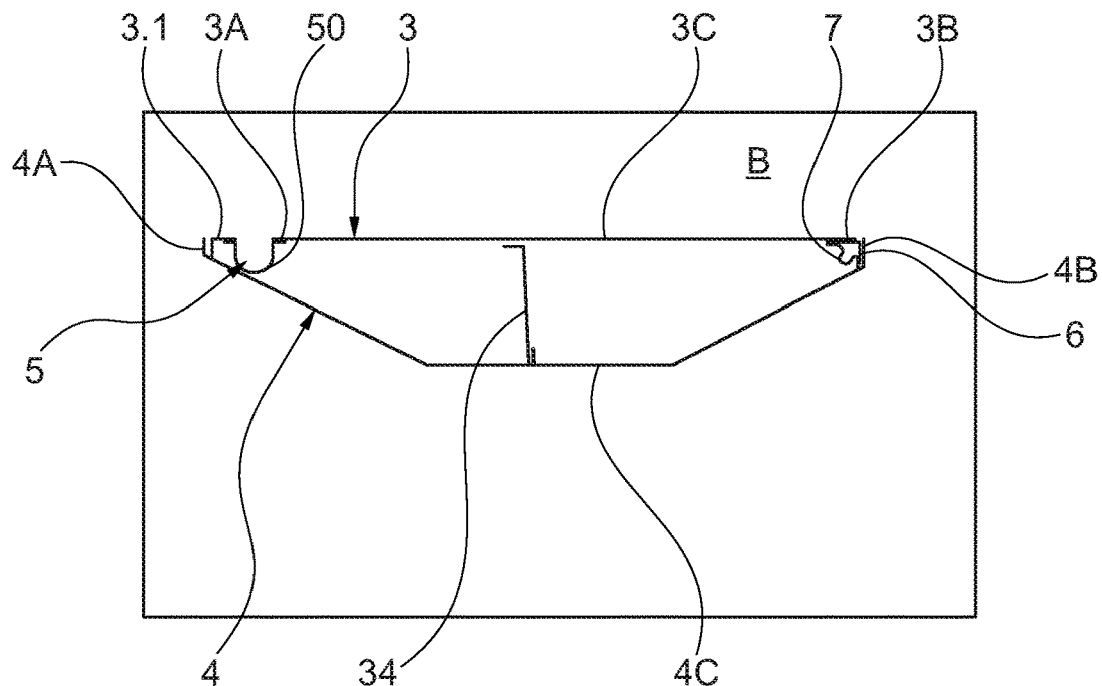
FIG. 1B shows, in a view correlating to FIG. 1A, the engine assembly in operation of the engine and with casing part which has undergone greater thermal expansion axially than the cover part.

FIG. 1A shows in extract such an engine assembly in a cross-sectional view parallel to the central axis M in a cold installation state. The casing part 4 of the core engine extending along the central axis M has a front end 4A and a rear end 4B. An elongate cover part 3 is fixed to both ends 4A and 4B. The cover part 3 has a comparatively great extension in the axial direction and connects together the two ends 4A and 4B of the casing part 4.

At a front end 4A of the casing part 4, for example a so-called intermediate casing is provided, while a turbine stage of the engine T adjoins the rear end 4B. The casing part 4 has a middle part 4C extending between the ends 4A and 4B and lying opposite a middle part 3C of the cover part 3. The two middle parts 3C and 4C are connected together via a middle connecting element 34 in the form of a so-called bracket. This middle connecting element 34 alone cannot adequately compensate for different thermal expansions of the cover part 3 and casing part 4. Thus an outside of the cover part 3 delimits the bypass duct B and thus, in operation of the engine T, is subjected to significantly lower thermal load than the casing part 4 assigned to the core engine, which expands significantly more greatly along the central axis M than the cover part 3.

In the embodiment variant shown in FIG. 1A, two different measures are provided for effective compensation. Firstly, at a front end 3A of the cover part 3, a connection is created to the front end 4A of the casing part 4 via a first connecting element 5 which forms an expansion portion 50 with a depression in the form of a channel 500 pointing radially inward and extending about the central axis in the circumferential direction U. At a rear end 3B of the cover part 3, a connection is made to the rear end 4B of the casing part 4 via a connecting assembly 6, 7 which comprises a second connecting element 6 and an additional supporting element 7. The two elements 6 and 7 of the connecting assembly 6, 7 here perform different functions, and can thus be designed specifically for these different functions. Whereas the second connecting element 6, here also serving for fire protection, is formed as a fire-inhibiting or fire-resistant bulkhead because of its shape extending in the circumferential direction U, the additional supporting element 7 serves to support two flange portions 61, 62 of the second connecting element 6 (see FIG. 4) and to provide adequate bending stiffness to prevent disruptive vibrations in the region of the rear end 3B of the cover part 3.

Figure 1B:
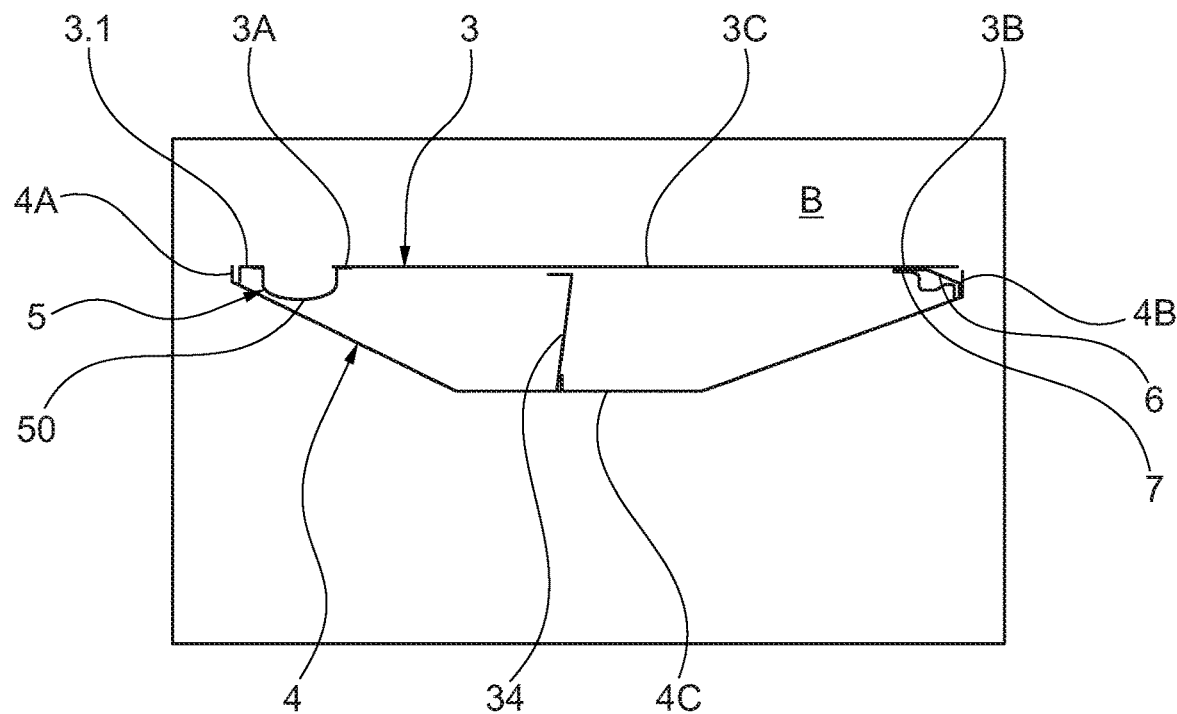

As illustrated diagrammatically in FIG. 1B, the front first connecting element 5 in the region of the expansion portion 50 may also lengthen in targeted fashion in order to compensate for a thermally induced greater thermal expansion of the casing part 4 along the central axis M. Also, the connecting assembly 6, 7 allows an elongation of the casing part 4 relative to the cover part 3 at the rear end 3B of the cover part 3.

Figure 2:
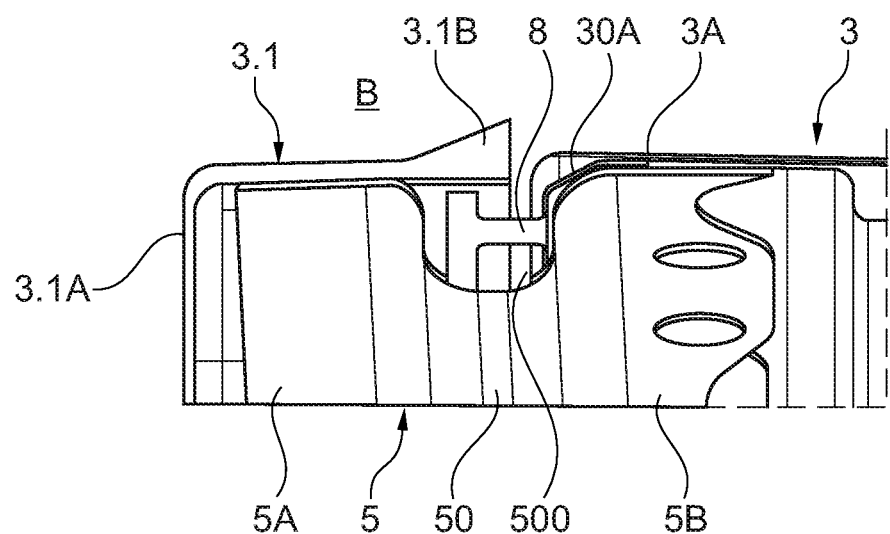
FIG. 2 shows, in extract and in perspective view looking radially outward, a front end of the cover part with a first connecting element which forms an elongate, channel-like depression in the circumferential direction on an expansion portion in order to compensate for the different thermal expansion according to FIG. 1B.
Figure 3:
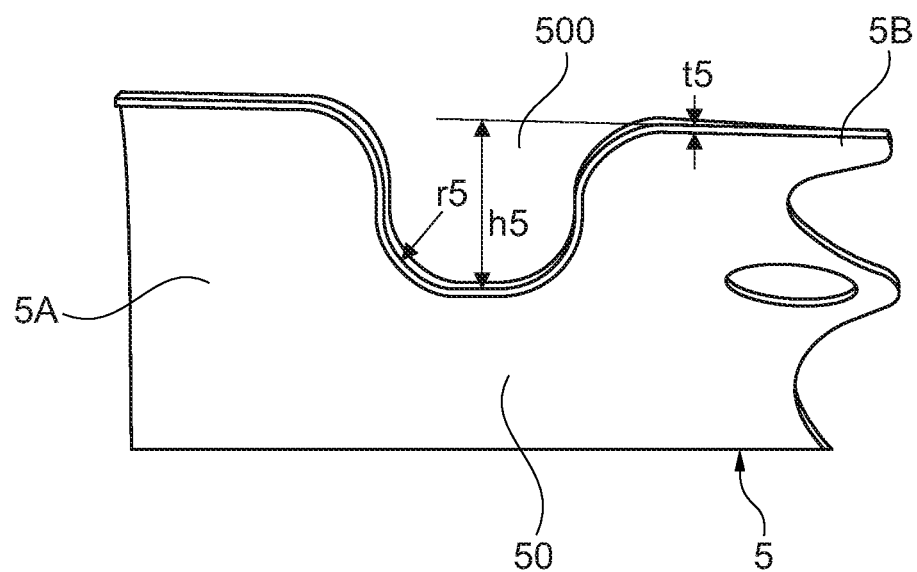
FIG. 3 shows, in extract and individually, the first connecting element from FIG. 2.

FIGS. 2 and 3 show on enlarged scale the front end 3A of the cover part 3 and the first connecting element 5 individually. The first connecting element 5 configured as a sheet metal part extends as a strip in the circumferential direction and accordingly follows a portion of a circular path about the central axis. Around the middle, the first connecting element 5 has the channel 500 extending in the circumferential direction U (see FIG. 5), on an expansion portion 50 of the first connecting element 5 which connects together the two front and rear edges 5A and 5B of the first connecting element 5.

An intermediate part 3.1 is welded to the front edge 5A and is bolted to the front end 4A of the casing part 4 by an end flange portion 3.1A. At the rear end 3.1B lying downstream in the flow direction, the intermediate part 3.1 has a guide element 31B which extends at least partially beyond the channel 500. In this way, the guide element 31B guides fluid beyond the channel 500 and hence the expansion portion 50, in order to avoid disruptive turbulence in the region of the expansion portion 50 of the first connecting element 5.

At the rear edge 5B of the first connecting element 5, several fixing holes are formed via which the first connecting element 5 is fixed to the cover part 3, so that the first connecting element 5 fixes the cover part 3 relative to the casing part 4 at its front end 3A. Here it is not essential for the fixing to take place directly at the front end 4A of the casing part 4 itself. Alternatively, fixing is also possible at an upstream engine component, in particular an engine component of the core engine.

The channel 500—in this case formed with U-shaped cross-section—in the first connecting element, which for example is formed by a circumferential bead, forms an expansion portion 50 of the first connecting element 5 with a defined, reduced bending stiffness. The expansion portion 50 may thus function as a bending joint in order to allow a length compensation in the axial direction because of the different thermal expansions of the cover part 3 and casing part 4.

In order simultaneously to ensure that the defined flexibility in the region of the expansion portion 50 is not accompanied by an overload of the connecting element 5 on expansion in the axial direction, and a significantly increased susceptibility to disruptive vibrations in the region of the front end 3A of the cover part 3, a (mean) wall thickness or sheet thickness t5 of the first connecting element 5 and the geometric dimensions of the channel 500 are matched to each other. Thus with respect to the adjacent edges 5A and 5B, the channel 500 has a maximal depth/height h5 which in relation to the wall thickness t5 is at least 10 times greater (h5/t5≥10). Furthermore, the cross-sectional form of the channel 500 is also adapted. Thus the U-shaped cross-section is defined by two radii of curvature r5, via which a base of the channel 500 transforms into a respective right or left side wall and which are significantly greater than the wall thickness t5 of the first connecting element 5. In the present exemplary embodiment, for a radius of curvature r5, it is for example provided that this exceeds the wall thickness t5 by at least five times (r5/t5≥5).

In the region of the rear edge 5B of the first connecting element 5, an additional securing element 8 is fixed to the front end 3A of the cover part 3. This securing element 8 protrudes into the channel 500, below an edge element 30A of the cover part 3 pointing into the channel 500. The securing element 8, with respect to the edges 5A and 5B, is recessed slightly within the channel 500 and extends at least partially below the guide element 3.1B of the intermediate part 3.1. The securing element 8 prevents, in the region of the front end 3A of the cover part 3, portions from being able to protrude into the bypass duct B and settle there, even if a bolted connection to the connecting element 5 fails or is accidentally omitted in installation, maintenance or repair.

A function split is provided at the connecting assembly 6, 7 at the rear end 3B of the cover part 3. Here, the thin-walled second connecting element 6, formed with an L-shaped or V-shaped cross-section, performs the function of fire protection. A supporting element 7 or several supporting elements 7 serve to support the second connecting element 6, in order to avoid undesirable vibrations which would otherwise occur because of the great flexibility of the second connecting element 6. Thus the L-shaped or V-shaped second connecting element 6, which is longitudinally extended in the circumferential direction U, has a wall thickness t6 which is at least three times smaller than a wall thickness t7 of a supporting element 7 (t7/t6≥3). The second connecting element 6 serving for fire protection in the so-called zone 2 in the region of the bypass duct B has a first flange portion 61 on which a bolted connection to the rear end 3B of the cover part 3 is provided. A second flange portion 62 of the second connecting element 6 serves for bolted connection to the rear end 4B of the casing part 4 (or another engine component). The two flange portions 61 and 62 are oriented towards each other for example at an angle of around 90° in the cold installation state shown in FIG. 4. During operation of the engine T and under the resulting elongation of the casing part 4, due to deformation, this angle defined between the flange portions 61 and 62 increases according to FIG. 1B.

To support the flange portions 61 and 62 relative to each other, at least one supporting element 7 with greater wall thickness t7 and a flexible expansion portion 70 extends between said flange portions 61 and 62. In the embodiment variant shown, in the circumferential direction U, several supporting elements 7, which are spaced apart from each other in the circumferential direction U, are provided at a second connecting element 6 for the rear end 3B of the cover part 3.

The expansion portion 70 of a supporting element 7 is here curved convexly away from the second connecting element 6. The convex curvature of the expansion portion 70 thus defines a depression with U-shaped cross-section in the form of a channel 700, which is provided between two flange portions 71 and 72 of the supporting element 7. At these flange portions 71 and 72, there is a bolted connection to the rear end 3B of the cover part 3 (in the case of the first flange portion 71), or a bolted connection to the rear end 4B of the casing part 4 (in the case of the second flange portion 72). Here, fixing holes 710 and 720 are provided at the respective flange portions 71 and 72 of the supporting element 7, and are brought into alignment with corresponding fixing holes on the flange portions 61 and 62 of the second connecting element 6.

For reduced bending stiffness of the supporting element 7, the expansion portion 70 with its channel 700 transforms via concave curves 73.1, 73.2 into its respective adjacent flange portions 71 or 72 of the supporting element 7. A radius of curvature r7a of the middle convex curve 73.3 defining the channel 700 is here selected greater than a radius of curvature r7b of a concave curve 73.1 or 73.2. The two radii of curvature r7a and r7b stand in a specific ratio to the wall thickness or sheet thickness t7 of the supporting element 7. Thus for example, the radius of curvature r7a of the middle convex curve 73.3 is at least five times greater than the wall thickness t7 (r7a/t7≥5). The radius of curvature r7b of a concave curve 73.1, 73.2 is in turn at least three times greater than the wall thickness t7 of the supporting element 7 (r7b/t7≥3).

For the ratio of a maximal depth/height h7 of the channel 700 at the expansion portion 70 of the supporting element 7 to the wall thickness t7, for example h7/t7≥9.

Figure 4:
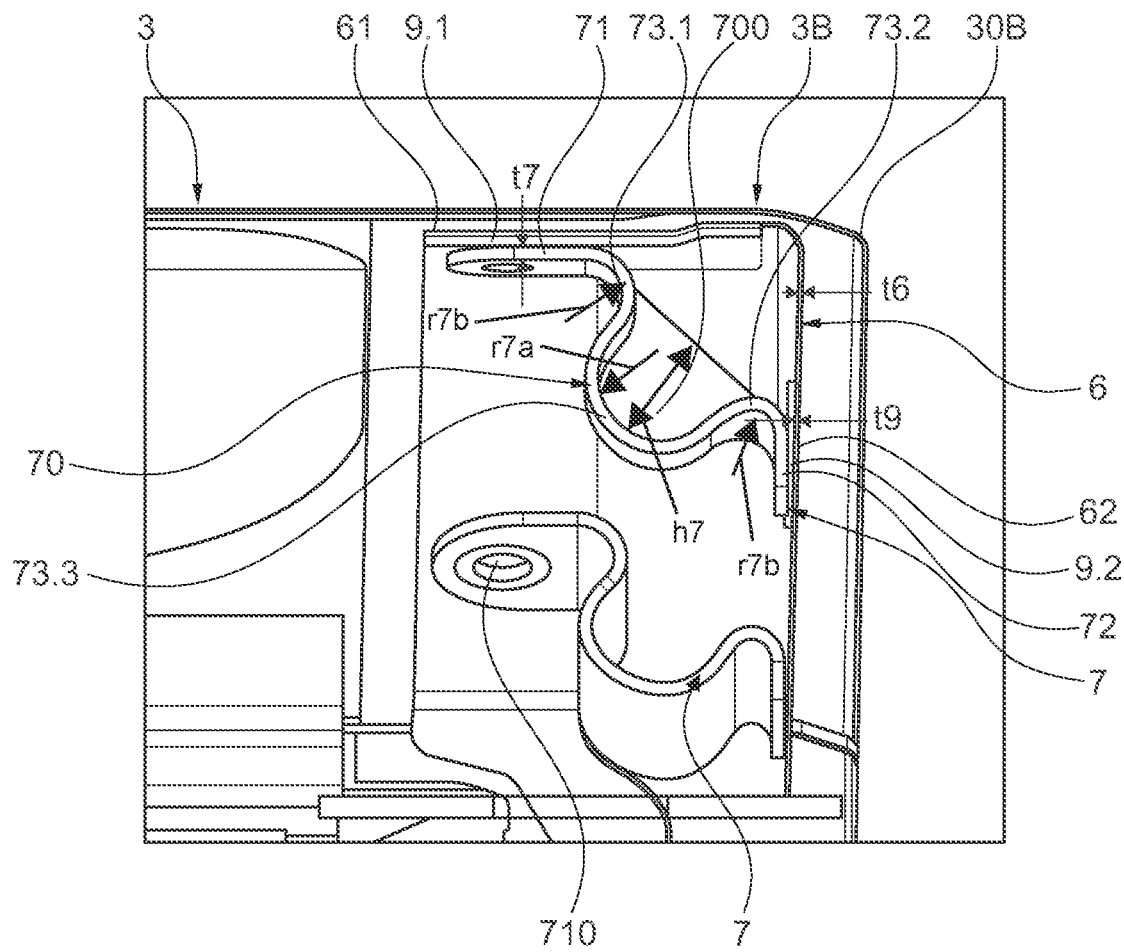
FIG. 4 shows, in extract and in perspective view looking radially outward, a rear end of the cover part from FIGS. 1A and 1B with a multipiece connecting assembly for fixing the cover part and compensating for different thermal expansions.

In particular, it is furthermore evident from FIG. 4 that the rear end 3B of the cover part 3 extends with an outflow lip 30B axially beyond the connecting assembly 6, 7, in order to guide a fluid stream in the bypass duct B beyond the connecting assembly 6, 7 in targeted fashion.

At the thin-walled second connecting element 6, in the region of the fixing holes 710 and 720 for bolting to the cover part 3 with the rear end 4B of the casing part 4, local reinforcing elements are provided in the form of welded reinforcing plates 9.1 and 9.2. A flange portion 71 or 72 of the supporting element 7 lies on these respective reinforcing plates 9.1, 9.2.

Because of the reinforcing plate 9.1, 9.2, the wall thickness of the second connecting element 6 with L-shaped or V-shaped cross-section is deliberately increased. For example, for a wall thickness t9 of a reinforcing plate 9.1 or 9.2, in relation to the mean wall thickness t6 of the second reinforcing element 6, (t6+t9)/t6≥3.

The combination of a thin-walled second connecting element 6 serving for fire protection, and several flexible supporting elements 7 which extend between the flange portions 61 and 62 and support these against each other, ensures that the connecting assembly 6, 7 guarantees adequate axial compensation for different thermal expansions of the cover part 3 and casing part 4. Here, the flexible supporting elements 7 may deform adequately under axial load without being overloaded.

Figure 5:
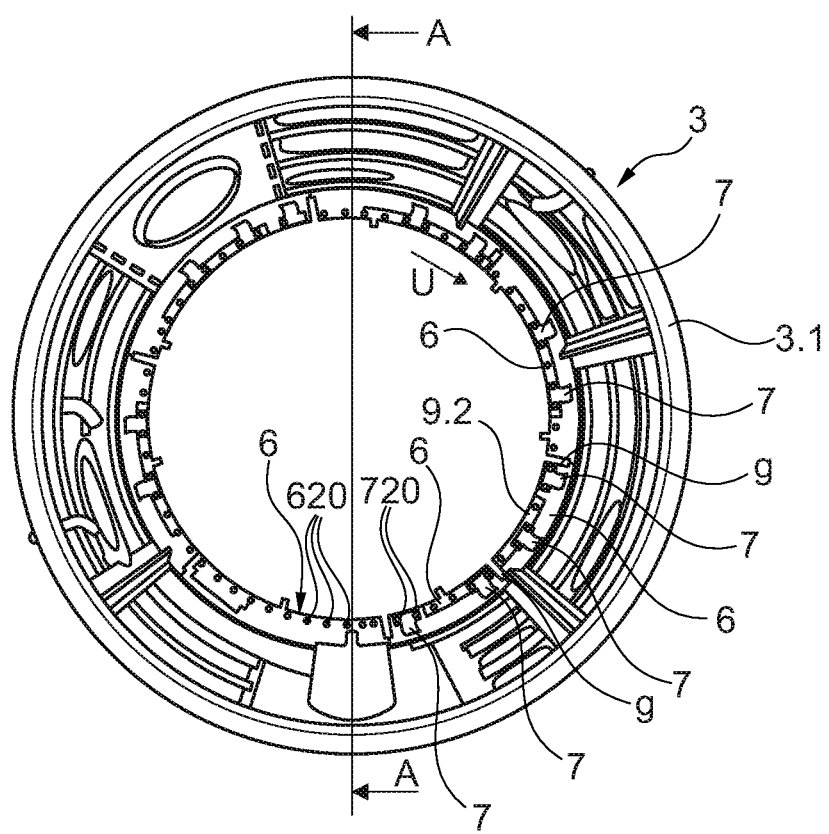
FIG. 5 shows, in front view looking along the central axis, a group of several cover parts arranged next to each other along a circular path and completely surrounding a core engine on the circumference when installed correctly in an engine.

As evident from the further depiction of FIG. 5, from the sectional illustration of FIG. 5A taken from this and shown in extract, and from the enlarged illustrations of FIGS. 6 and 7, several cover parts 3 are arranged next to each other in the circumferential direction U about the central axis M and are spaced apart from each other via a radial gap g. A first connecting element with the channel 500 extending in the circumferential direction U is provided at the front of each cover part 3, and a connecting assembly 6, 7 at the rear. The cover part 3 is fixed at the front end 3A via several fixing elements Bc, e.g. in the form of fixing bolts or screws, to the flange portion 3.1A of the intermediate part 3.1 which is welded to the first connecting element 5. The rear edge 5B of the first connecting element 5 is fixed to the cover part 3 via several fixing elements Bd.

To fix the rear end 3B of the cover part 3, several fixing elements are distributed around the circumference U and reach through the fixing holes 620 at several second connecting elements 6, wherein at least one second connecting element 6 is provided at the rear of each cover part 3. Flange portions 72 of a supporting element 7 with corresponding fixing holes 720 are provided on at least some of the fixing holes 620 of a second connecting element 6. Whereas flange portions 72 of a supporting element 7 are provided only on some of the fixing holes 620 of a second connecting element 6, local wall thickness reinforcement may be provided at all fixing points 620 of a second connecting element 6 by one or more reinforcing plates 9.2.

A flange portion 61 of a second connecting element 6 is bolted via several fixing elements Ba, Bb to the rear end 3B of the cover part 3. Whereas, according to the illustration in FIG. 7, a reinforcing plate 9.1 is present at all fixing holes of this flange portion 61 of the second connecting element 6, a flange portion 71 of a supporting element 7 is also only provided on some. If a flange portion 71 of a supporting element 7 is provided, the respective supporting element 7 is bolted to the cover part 3 and the flange portion 61 of the second thin-walled connecting element 6 via a fixing element Ba. At a fixing hole without supporting element 7 however, only a flange portion 61 of the second connecting element 6 is bolted to the cover part 3 via a fixing element Bb.

Figure 8:
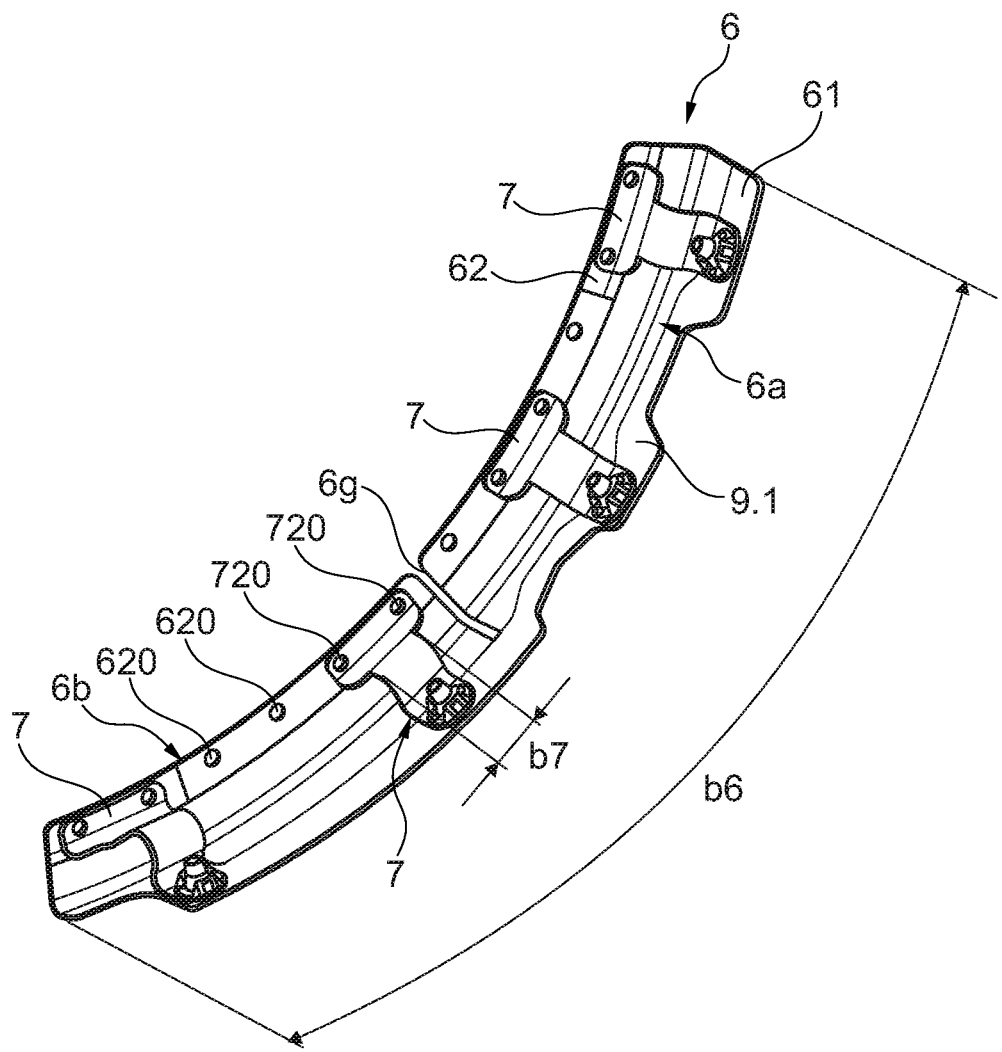
FIG. 8 shows, on enlarged scale and individually, an embodiment variant of a second connecting element with several supporting elements.

FIG. 8 shows in perspective and on enlarged scale a single second connecting element 6 which is formed longitudinally extended in the circumferential direction U and here extends with a (stretched) width b6 in the circumferential direction U. The elongate second connecting element 6 of L-shaped or V-shaped cross-section is configured curved, so that in mounted state it follows a circular line about the central axis M.

The second connecting element 6 is formed by two part pieces 6a and 6b which are at least partially interrupted by a radial gap 6g, and on each of which two supporting elements 7 are secured. Each of the supporting elements 7 appears T-shaped in top view and at its narrowest point has a width b7 along the circumferential direction U. The width b7 of a supporting element 7 here corresponds only to a fraction of the width b6 of the second connecting element 6. In the embodiment variant shown, the (stretched) width b6 of the second connecting element 6, which is curved in the circumferential direction U, is at least ten times greater than the width b7 of a non-curved supporting element 7, (b6/b7≥10). Due to the functional separation by the use of the thinner-walled second connecting element 6 firstly and the thicker-walled flexible supporting element 7 secondly, the widths b6 and b7 may differ considerably from each other, and in the case of the narrower supporting element 7, a curvature in the circumferential direction U may be omitted.

Figure 9:
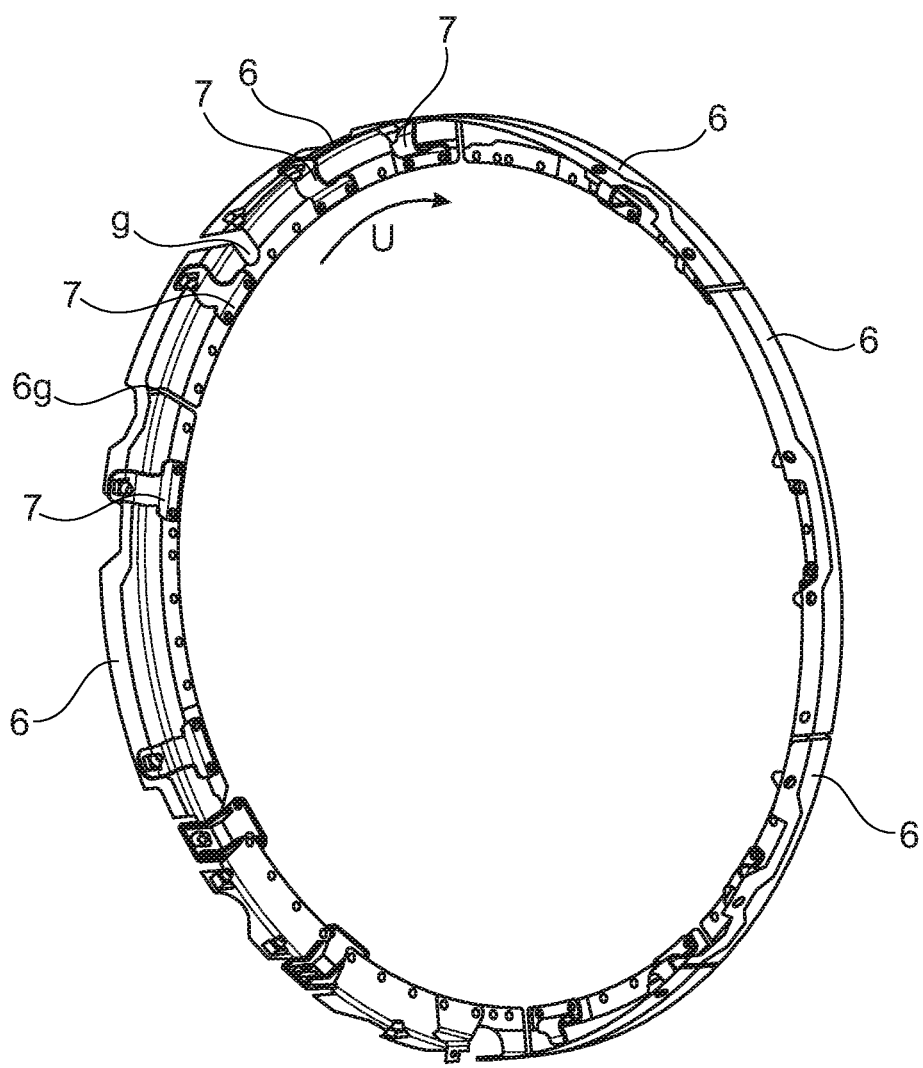
FIG. 9 shows in perspective view several second connecting elements arranged successively in a circumferential direction.
Figure 10A:
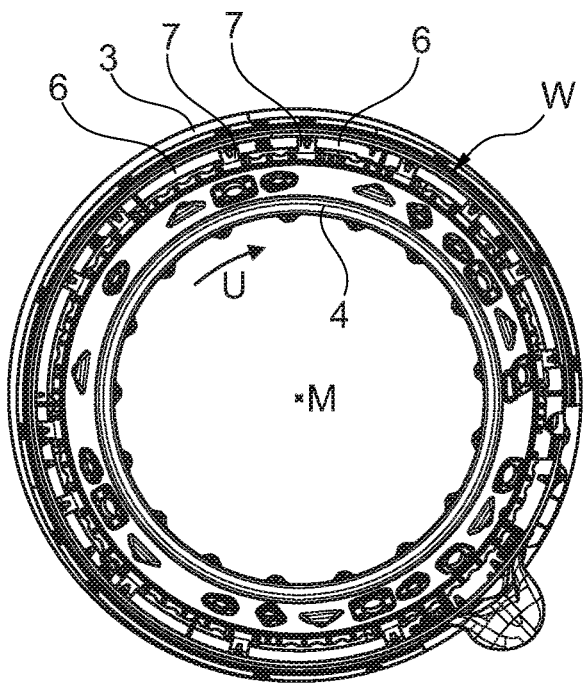
FIGS. 10A-10B show, in corresponding front views, the engine assembly with and without second connecting elements.
Figure 10B:
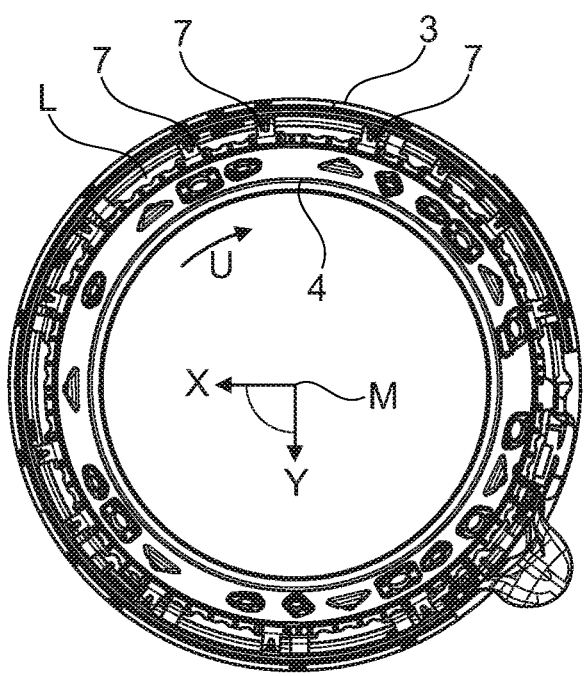

FIGS. 9A, 10A and 10B illustrate the effect of several second connecting elements 6 arranged successively in the circumferential direction U as a fire-inhibiting or fire-resistant bulkhead W at the rear end 3B of the cover part 3. The several second connecting elements 6, correctly arranged successively in the circumferential direction U, form an annular bulkhead W (see FIGS. 9 and 10A), which at the rear end 3B closes an otherwise residual gap in the form of an annular gap L (FIG. 10B). Without formation of the bulkhead W and hence a seal between the so-called "core fairing panels" in the form of the cover parts 3 and the casing 4 via the several second connecting elements 6, accordingly a fire could propagate almost unhindered through the annular gap L. Thus an almost unhindered air flow would be possible through the annular gap L. The individual second connecting elements 6 thus have particular importance in the context of fire protection inside the engine T.

LIST OF REFERENCE SIGNS

11 Low-pressure compressor
12 High-pressure compressor
13 High-pressure turbine
14 Medium-pressure turbine
15 Low-pressure turbine
2 Mixer assembly
20 Mixer
21 Interface
3 Cover part
3.1 Intermediate part
3.1A Flange portion
3.1B Guide element
30A Edge element
30B Outflow lip
34 Middle connecting element
3A Front end
3B Rear end
3C Middle part
4 Casing part
4A Front end
4B Rear end
4C Middle part
5 1st connecting element
50 Expansion portion
500 Channel (depression)
5A Front edge
5B Rear edge
6 2nd connecting element
6a, 6b Part piece
6g Radial gap
61, 62 Flange portion
620 Fixing hole
7 Supporting element
70 Expansion portion
700 Channel (depression)
71, 72 Flange portion
710, 720 Fixing hole
73.1, 73.2 Concave curves
8 Securing element
9.1, 9.2 Reinforcing plate (reinforcing element)
A Outlet
B Bypass duct
Ba, Bb, Bc, Bd Fixing element
BK Combustion chamber portion
b6, b7 Width C Outlet cone
E Inlet/Intake
F Fan
f1, f2 Fluid stream
FC Fan casing
g Radial gap
h5, h7 Height
L Annular gap/gap
M Central axis/axis of rotation
R Inlet direction
r5, r7a, r7b Radius of curvature
S Rotor shaft
T Engine
t5, t6, t7, t9 Panel thickness (wall thickness)
TT Turbine
U Circumferential direction
V Compressor
W Bulkhead

The invention claimed is:

1. An engine assembly, with
a casing part extending along a central axis,
at least one cover part which at least partially covers an outside of the casing part, and
at least one connecting element via which the at least one cover part is fixed relative to the casing part and which compensates for different thermal expansions of the casing part and the at least one cover part,
wherein the at least one connecting element:
comprises first and second flange portions for connecting the cover part to the casing part or to a further engine component connected to the casing part, of which the first flange portion is connected to the cover part and the second flange portion is connected to the casing part or to the further engine component, and
is part of a connecting assembly which comprises, in addition to the at least one connecting element, at least one separate supporting element which has thicker walls than the at least one connecting element and supports the first and second flange portions against each other, and extends between the first and second flange portions with a flexibly formed expansion portion.

2. The engine assembly according to claim 1, wherein the expansion portion comprises a corrugated region.

3. The engine assembly according to claim 2, wherein the corrugated region is S-shaped in cross-section.

4. The engine assembly according to claim 1, wherein in cross-section, the expansion portion forms a convex curve and two concave curve connecting regions, between which the convex curve is positioned.

5. The engine assembly according to claim 4, wherein the convex curve has a radius of curvature r7a for which, in relation to a mean wall thickness t7 of the supporting element: $r7a/t7 \geq 5$.

6. The engine assembly according to claim 4, wherein each concave curve has a radius of curvature r7b for which, in relation to a mean wall thickness t7 of the supporting element: $r7b/t7 \geq 3$.

7. The engine assembly according to claim 4, wherein a radius of curvature of the convex curve is in each case greater than a radius of curvature of one of the concave curves.

8. The engine assembly according to claim 1, wherein the expansion portion forms a convex curve which defines a depression of U-shaped cross-section on the expansion portion.

9. The engine assembly according to claim 8, wherein for a maximal height h7 of the depression of U-shaped cross-section, in relation to a mean wall thickness t7 of the supporting element: $h7/t7 \geq 9$.

10. The engine assembly according to claim 1, wherein in relation to a mounting state of the engine assembly in which an engine comprising the engine assembly is not in operation, the at least one connecting element is configured with an L-shaped or a V-shaped cross-section.

11. The engine assembly according to claim 1, wherein the at least one connecting element has a mean wall thickness t6 for which, in relation to a mean wall thickness t7 of the supporting element: $t7/t6 \geq 3$.

12. The engine assembly according to claim 1, wherein the at least one connecting element extends in a circumferential direction with a width which is multiple times greater than a width with which the supporting element extends in the circumferential direction.

13. The engine assembly according to claim 12, wherein for a width b6 of the at least one connecting element in relation to a width b7 of the supporting element: $b6/b7 \geq 10$.

14. The engine assembly according to claim 1, wherein at least one of the first and second flange portions has a reinforcing element via which a wall thickness of the at least one connecting element is locally increased in a region of the first or second flange portion on which the supporting element lies and/or at which at least one fixing element is provided for fixing the cover part to the casing part or to the further engine component connected to the casing part.

15. The engine assembly according to claim 14, wherein the reinforcing element has a mean wall thickness t9 for which, in relation to a mean wall thickness t6 of the at least one connecting element: $(t6+t9)/t6 \geq 3$.

16. The engine assembly according to claim 1, wherein the at least one connecting element is a component configured for fire protection.

17. An engine assembly, comprising:
a casing part of a core engine of the engine assembly, circumferentially surrounding the core engine, with respect to a central axis of the core engine, and extending axially along the central axis,
at least one cover part which at least partially covers an outside of the casing part, and extends circumferentially around the casing part, and
at least one connecting element via which the at least one cover part is fixed relative to the casing part and which compensates for different thermal expansions of the casing part and the at least one cover part,
the at least one connecting element including an expansion portion configured for compensating for the different thermal expansions, the expansion portion including a channel depression extending in a circumferential direction and being U-shaped in cross-section, pointing radially inward or outward relative to the central axis.

18. The engine assembly according to claim 17, wherein the at least one cover part delimits a bypass duct of the engine assembly.

19. An engine assembly, with
a casing part extending along a central axis,
at least one cover part which at least partially covers an outside of the casing part, and for this, in relation to the central axis, extends along a circumferential direction which points along a circular path around the central axis, and
at least one first connecting element and at least one second connecting element, wherein the at least one cover part is fixed in relation to the casing part via the at least one first connecting element at a first end of the cover part relative to the central axis, and via the at least one second connecting element at a second end of the cover part facing away from the first end relative to the central axis, and the at least one first and second connecting elements compensate for different thermal expansions of the casing part and the at least one cover part, wherein:
- a) the at least one first connecting element has an expansion portion for compensating for the different thermal expansions, which forms a depression extending in the circumferential direction and is U-shaped in cross-section, pointing radially inward or outward relative to the central axis, and
- b) the at least one second connecting element
    - comprises first and second flange portions for connecting the cover part to the casing part or to a further engine component connected to the casing part, of which the first flange portion is connected to the cover part and the second flange portion is connected to the casing part or to the further engine component, and
    - is part of a connecting assembly which comprises, in addition to the at least one second connecting element, at least one separate supporting element which has thicker walls than the at least one second connecting element and supports the first and second flange portions against each other, and extends between the first and second flange portions with a flexibly formed expansion portion.

* * * * *